W. P. ANTHONY.
MOWING MACHINE.
APPLICATION FILED OCT. 28, 1910.

1,022,291.

Patented Apr. 2, 1912.

2 SHEETS—SHEET 2.

Witnesses
J. Adolph Bishop
C. S. Brown

Inventor
Wendell P. Anthony
by Foster Freeman Watson Hoit
Attorneys

UNITED STATES PATENT OFFICE.

WENDELL P. ANTHONY, OF EDDYSTONE, PENNSYLVANIA, ASSIGNOR TO WM. SIMPSON & SONS, OF PHILADELPHIA, PENNSYLVANIA, A FIRM.

MOWING-MACHINE.

1,022,291.  Specification of Letters Patent.  Patented Apr. 2, 1912.

Application filed October 28, 1910. Serial No. 589,539.

*To all whom it may concern:*

Be it known that I, WENDELL P. ANTHONY, a citizen of the United States, and resident of Eddystone, county of Delaware, State of Pennsylvania, have invented certain new and useful Improvements in Mowing-Machines, of which the following is a specification.

This invention comprises means for operating by power a mowing machine of the type usually operated by hand in which there are two ground wheels and a rotating cutter connected with the ground wheels by a train of gearing.

By means of the invention a large and heavy machine adapted to cut a wide swath may be operated by a single person with less effort than is now necessary to cut a narrow swath with a light machine.

Figure 1:
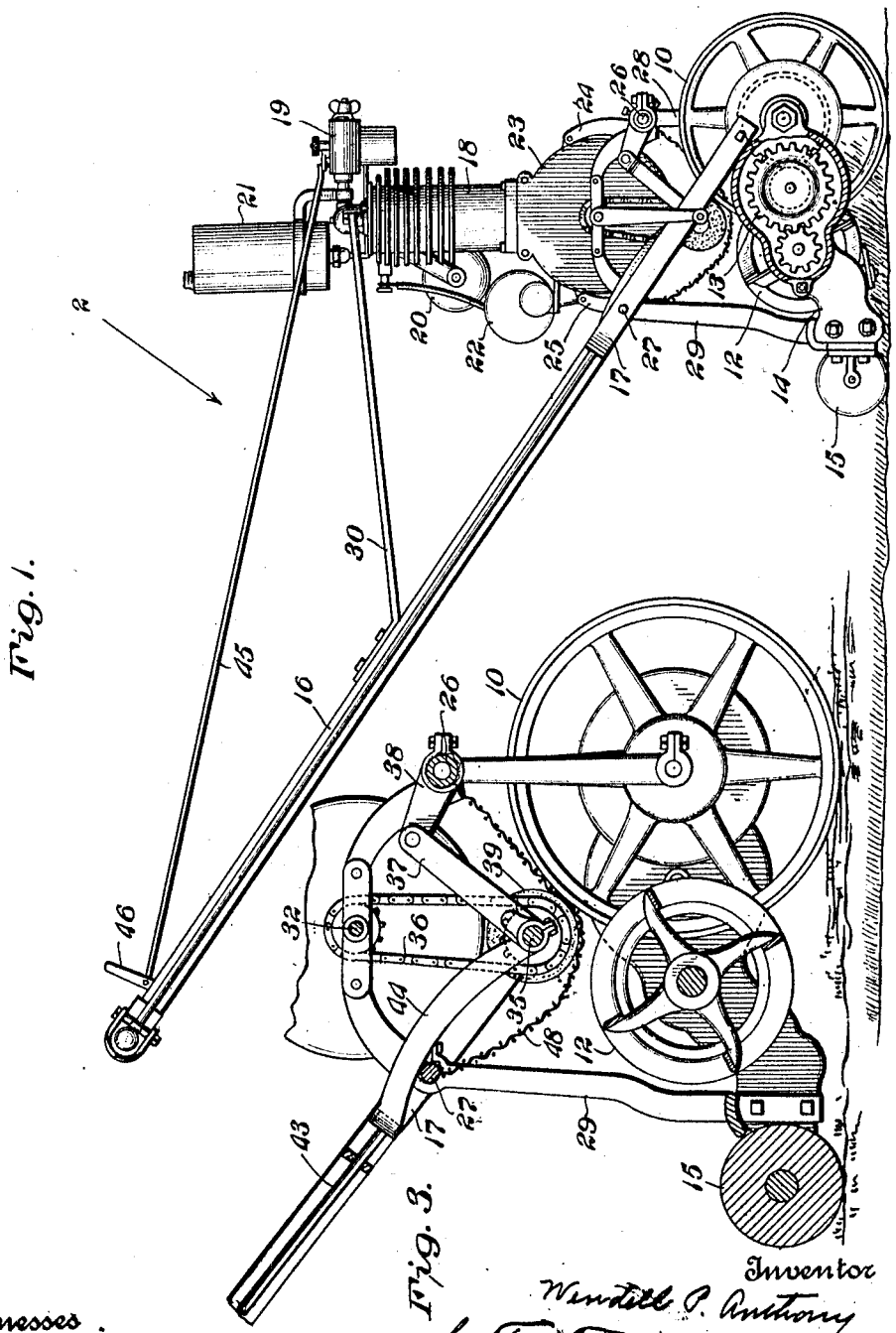
Figure 2:
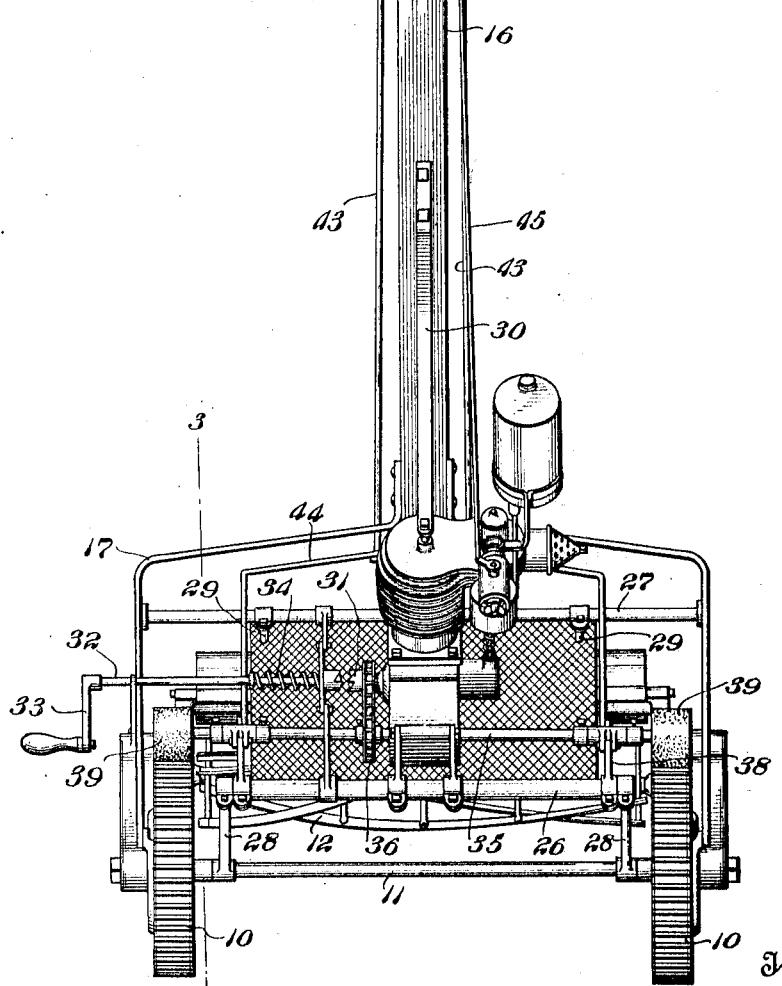

The invention will be described in connection with the accompanying drawing, in which, Figure 1 is a side elevation of the complete machine, parts being broken away; Fig. 2 is a plan view, viewing the machine in the direction of the arrow 2 of Fig. 1. Fig. 3 is an enlarged partial side view, parts being broken away.

My invention may be embodied in any of the ordinary types of hand mowing machines, one of which is illustrated in the drawings. The machine illustrated comprises ground wheels 10 mounted upon a fixed axle 11 and adapted to transmit motion to a rotating cutter 12 through a train of gearing 13. The cutter and gearing are mounted in a suitable frame 14, which frame also carries the usual roller 15, for supporting the rear side of the machine and regulating the depth of cut. The machine is also provided with the usual handle bar 16 and bail 17 connecting the handle bar with the end castings of the frame. The parts so far described are of ordinary construction and any equivalent mowing machine structure may be substituted therefor without departing from the spirit of the present invention.

I have mounted on the frame of the mowing machine a gasolene engine of ordinary construction comprising a cylinder 18, carbureter 19, muffler 20, gasolene tank 21, magneto 22 and crank case 23. All of these features may be of any approved design. The engine should be as light as practicable, consistent with the power required, and I therefore prefer an engine of the air cooled type.

The engine is supported by two brackets 24, 25, carried respectively by rods 26, 27. The forward rod 26 is supported by arms 28 fixed upon the cross rod or shaft 11 and the rear rod 27 is supported by arms 29 connected with the end castings of the frame 14. The engine is securely braced in its position on the frame by means of a rod 30 fixed to the handle bar 16 and the top of the cylinder. The crank shaft of the engine is provided with a clutch member 31 adapted to be engaged by a similar clutch member on a starting shaft 32 provided with the usual crank 33. A spring 34 normally holds the clutch members apart. A shaft 35 is connected with the crank shaft by means of sprocket gearing 36, or other suitable connecting means. The shaft 35 is mounted in bearings carried by links 37 depending from arms 38 fixed on the cross rod 26. Shaft 35 carries friction rollers 39 adapted to bear on the ground wheels 10 and transmit motion from the engine to the ground wheels. These friction rollers are held normally slightly removed from the ground wheels and are adapted to be pressed into engagement with the ground wheels by hand levers 40, preferably carried over the usual handles 41 and normally raised so as to hold the friction wheels free from the ground wheels by suitable springs 42. The hand levers 40 are connected by means of rods 43 with a bail 44, the arms of which are pivotally connected with the driven shaft 35, or preferably with the bearings of this shaft. Suitable means may also be mounted upon the handle bar for controlling the motor, the drawings showing a rod 45 for operating the throttle in the carbureter 19, said rod being connected with a short lever 46 pivoted on the handle bar near the handles 41. The amount of movement necessary to move the friction rollers into and out of engagement with the ground wheels is very slight and such movement can be given to the friction wheel shaft without disturbing its connection with the engine through the sprocket gearing 36. To prevent the short grass from getting up into the sprocket chain and about the engine I preferably extend a wire screen 48 from the rod 26 to the rod 27 around and beneath the sprocket gearing and the starting clutch.

The operation of the invention will be obvious from the foregoing description and need only be briefly described. When it is desired to operate the mower the motor is started and permitted to run continuously Upon gripping together the handles 40, 41, the rods 43 will be pressed forward and the shaft 35 moved forward bringing the friction wheels 39 into contact with the rough or knurled surfaces of the ground wheels 10. The ground wheels are thus driven in the direction to move the mower forward and the cutter is in turn driven by the ground wheels. The mower can thus be operated without any exertion upon the part of the operator excepting such exertion as is required in walking after and guiding the machine. In fact, in working on the level or on down hill the mower can be relied upon to exert sufficient tractive force to aid the operator in following it. By the use of this invention a man can do much more work than by hand power alone for the reason that he can cut a wider swath and move the machine faster and with less effort than when he is required to exert all the power necessary.

Having described the invention what I claim and desire to secure by Letters Patent is, 1. A mowing machine comprising ground wheels, a cutter, and a handle bar for guiding the machine, in combination with a motor mounted on the machine, driving wheels mounted on a movable shaft and arranged to be driven by the motor, and means on the handle bar for throwing the driving wheels into and out of direct engagement with the ground wheels.

2. A mowing machine comprising ground wheels, a cutter, and a handle bar for guiding the machine, in combination with a motor mounted on the machine, friction wheels mounted on a swinging shaft and arranged to be driven by the motor, and means on the handle bar for throwing the friction wheels into and out of direct engagement with the ground wheels.

3. A mowing machine comprising a frame, a pair of ground wheels, a rotary cutter driven by the ground wheels and a guiding handle bar, in combination with a motor mounted on the frame, a shaft mounted in movable bearings, means connecting the motor with said shaft, friction wheels on said shaft and movable therewith into and out of direct engagement with the tread of ground wheels, and means mounted on the handle bar for moving said shaft and friction wheels.

4. A mowing machine comprising a frame, ground wheels, a rotary cutter, means for operatively connecting the cutter with the ground wheels whereby the cutter is driven by the ground wheels, means for driving the ground wheels comprising a driven shaft having wheels adapted to engage the ground wheels, a swinging support for said shaft whereby the driving wheels may be moved into and out of engagement with the ground wheels, a motor, a sprocket chain connecting the motor shaft with the said driven shaft, a handle bar, means supported on the handle bar for swinging the driven shaft to carry its wheels into and out of engagement with the ground wheels, and additional means supported on the handle bar for controlling the motor.

In testimony whereof I affix my signature in presence of two witnesses.

WENDELL P. ANTHONY.

Witnesses:
BENJAMIN WEIR, Jr.,
CHAS. C. JÖRGENSEN.